United States Patent [19]

Lancaster

[11] 4,327,760
[45] May 4, 1982

[54] NON-INTERRUPTING GAS METER EXCHANGE SYSTEM

[76] Inventor: James W. Lancaster, Rte. 2, Box 520, Sheridan, Ark. 72150

[21] Appl. No.: 167,406

[22] Filed: Jul. 11, 1980

[51] Int. Cl.³ ............................................ F16K 43/00
[52] U.S. Cl. ...................................... 137/15; 73/201; 137/315; 137/317; 137/559; 285/18; 285/30; 312/1
[58] Field of Search ................ 73/201, 262, 272, 273, 73/274; 137/15, 315, 317, 559, 231, 238; 285/12, 18, 30; 312/1

[56] References Cited

U.S. PATENT DOCUMENTS

| | | | |
|---|---|---|---|
| 2,039,748 | 5/1936 | Stevens | 137/315 |
| 2,786,740 | 3/1957 | Taylor et al. | 312/1 |
| 3,122,158 | 2/1964 | Grunsky | 137/317 |
| 3,148,690 | 9/1964 | Petersen | 137/15 |
| 3,173,295 | 3/1965 | Magleby | 73/201 |
| 3,245,257 | 4/1966 | Anderson | 73/201 |
| 3,256,735 | 6/1966 | Smith | 73/201 |
| 3,310,322 | 3/1967 | Carroll | 137/315 |
| 3,615,159 | 10/1971 | Munoz | 137/15 |
| 3,946,754 | 3/1981 | Cook | 137/315 |

Primary Examiner—George L. Walton
Attorney, Agent, or Firm—Stephen D. Carver

[57] ABSTRACT

A method and apparatus for exchanging a gas meter without interrupting customer service. The apparatus preferably comprises a rigid frame for temporarily securing a meter to be exchanged independently of its mounting nuts, and an isolating enclosure adapted to be selectively removeably coupled about a portion of the meter loop terminal to provide a fluid flow bypass around the meter. A rigid conduit is adapted to be positioned within the enclosure means until the meter is removed, at which point it will be inserted in the meter loop to bypass the meter to facilitate enclosure removal. Purging apparatus is included to remove air from the enclosing volume and the replacement meter. The method comprises the steps of temporarily securing the meter to be removed relative to its mounting, providing a fluid flow pathway for bypassing the meter by sealably enclosing a volume about the meter loop terminals in fluid flow communication therewith, purging air from the volume prior to disconnecting the meter, disconnecting the meter and bypassing it with a conduit to allow removal of the enclosing volume and the meter to be replaced, substituting a new meter, reestablishing a fluid flow pathway by reinstalling the enclosing volume, purging unwanted air, removing the bypass conduit from the meter loop terminals, attaching the replacement meter to the meter loop, and finally removing the bypass pathway enclosure.

8 Claims, 9 Drawing Figures

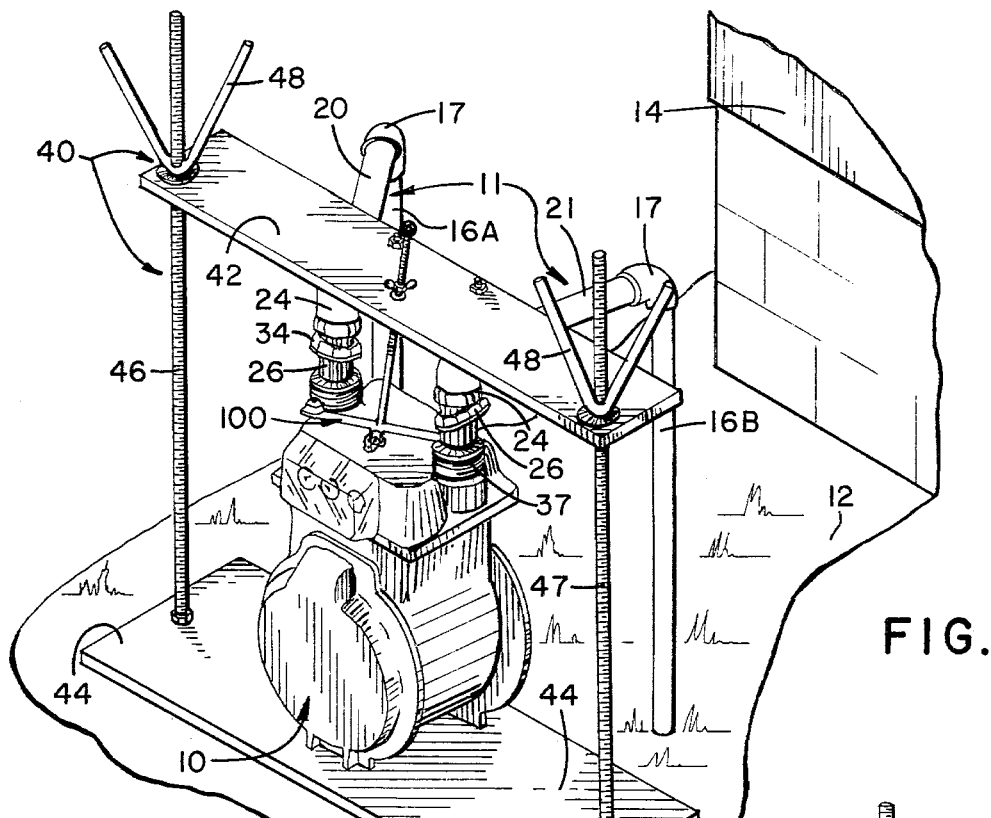
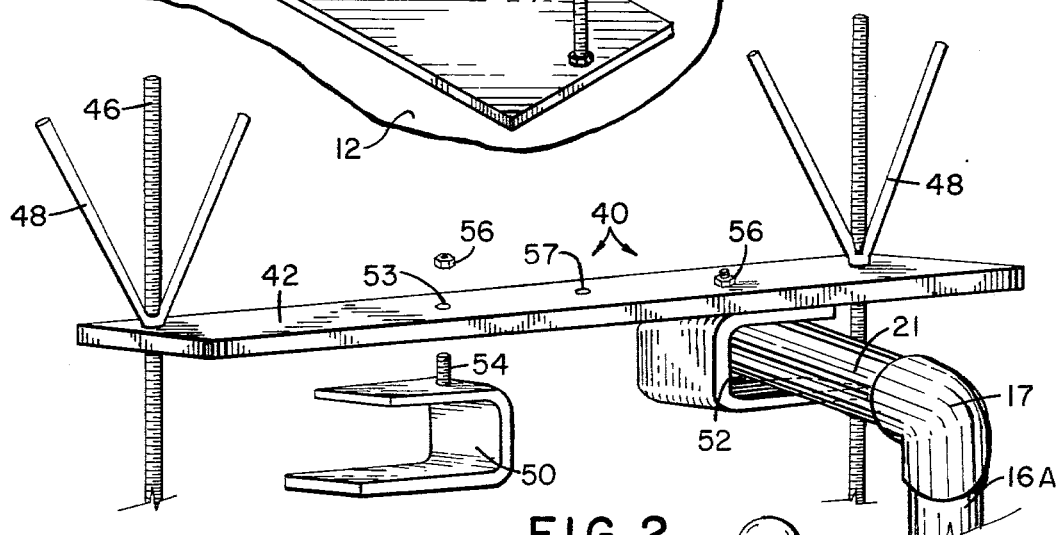
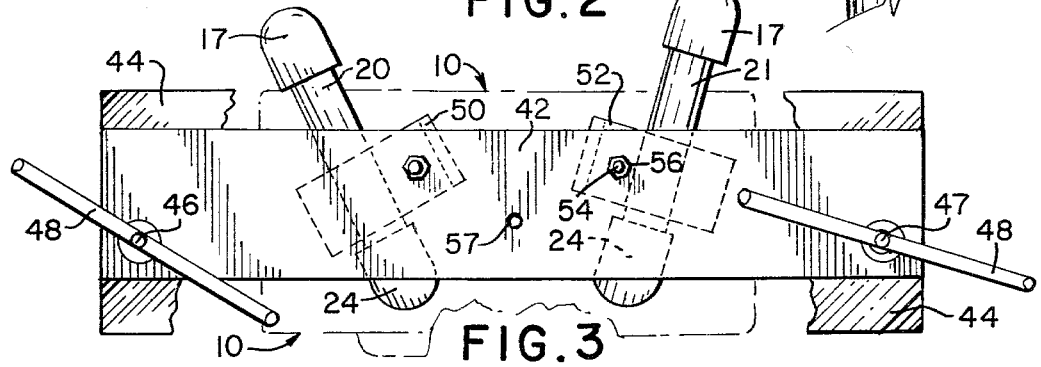

NON-INTERRUPTING GAS METER EXCHANGE SYSTEM

BACKGROUND OF THE INVENTION

The present invention relates generally to gas meter exchange systems. More particularly, the present invention relates to a method and apparatus for replacing a gas meter without interrupting customer gas service.

As will be appreciated by those skilled in the art, gas meters, and meters used by other utilities, must be periodically replaced in accordance with routine maintenance programs. It is customary to replace meters when their accuracy is questioned. Meters typically are routinely replaced when aged beyond certain limits.

An obvious and outdated approach is to simply remove the old meter without any attempt to maintain customer service during maintenance. Removal is effectuated by loosening the swievel nuts which couple it to the meter loop. The meter is then quickly removed and its replacement may then be reinstalled. However, it will immediately be recognized that this conventional meter exchange technique results in an at least temporary interruption in gas service. Hence certain gas appliances may require pilot light reignition after the replacement meter is appropriately installed. The service or labor costs of first turning off and then re-lighting all of the pilot lights which may be found at a particular customer location may be significant. With older gas operated appliances such as water heaters the pilot light may not be easy to reestablish after service interruption. This may be caused by aging safety thermo couples which close the gas flow in the pilot flame line in response to sensed temperature loss occurring during the interruption. In such cases reestablishment of the pilot flame will be exceedingly difficult and/or expensive, if not impossible.

Consequently it has been suggested in the prior art to provide a system for changing meters which will facilitate meter replacement without interrupting service. However, all known prior art attempts have required the use of special accessory pipe fittings of various forms which must be installed at all service locations. For a gas utility company, for example, to properly employ such technology, all existing service locations must be modified or replaced with "non-interrupt" accessory hardware. The cost factors in such a massive adaptation are prohibitive. Examples of prior art of the latter type may be seen in U.S. Pat. Nos. 3,122,158; 3,148,690; and 3,438,397.

SUMMARY OF THE INVENTION

The present invention comprises a method and apparatus for changing a gas meter without interrupting customer service.

The apparatus comprises a rigid, generally rectangular frame which is adapted to secure the meter relative to its meter loop independently of its mounting or "swivel" nuts. An isolating enclosure system is included to selectively removably enclose the meter loop terminals thereby defining a confined volume in fluid flow relation with the meter loop terminals thereby bypassing the meter. A rigid bypass conduit temporarily stored within the enclosure system may be placed in the meter loop to then bypass the enclosure, permitting subsequent removal of the enclosure and the old meter. A purge system is employed to evacuate air from the replacement meter and from the enclosure system which must be reinstalled with respect to the meter loop terminals. After the reinstalled enclosure is appropriately purged of air, the rigid bypass conduit may be removed, permitting installation of the new meter. After the new meter is secured to the meter loop, the enclosure system may be removed, permitting installation of the new meter. After the new meter is secured to the meter loop, the enclosure system may be removed, and the customer will not experience an interruption of service.

In one form of the invention it is contemplated to provide an enclosure system comprising a bag which will completely surround the meters being exchanged. Alternatively, the enclosure system may be formed from a two-piece, generally resilient encapsulating volume formed from first and second members adapted to be removably coupled to each other in in sealed relation. The latter enclosure members will not enclose the meter, contacting only the meter loop terminals and the uppermost terminals of the meters being exchanged.

Thus an object of this invention is to provide a method and apparatus for reliably and easily exchanging gas meters without interrupting customer service.

Another object of this invention is to provide a method and apparatus of the character described which may be employed with existing gas meters without permanently mounting accessory fittings on every existing gas installation.

Another object of this invention is to provide a method and apparatus of the character described adapted to fit on a standard meter loop without special fittings.

Another related object is to provide a method and apparatus of the character described which requires no special pressurized cylinders, as known to be required by prior art devices.

A still further object of this invention is to provide a method and apparatus adapted to facilitate non-interrupting gas meter exchange which may be practiced by gas company personnel with a minimum of training and special equipment.

A still further object of this invention is to provide a method and apparatus of the character described which will allow swivel washer and insulated swivel changes or modifications during meter replacement.

These and other objects and advantages of this invention, along with features of novelty appurtenant thereto, will appear of become apparent in the course of the following descriptive sections.

BRIEF DESCRIPTION OF THE DRAWINGS

In the appended drawings, which form a part of the specification and which are to be construed in conjunction therewith, and in which like reference numerals have been employed throughout to indicate like parts and various views:

FIG. 1 is an isometric, pictorial view illustrating a conventional gas meter and a meter loop to which it is attached, with the frame meter support system of the present invention illustrated attached to the meter loop, with parts of the figure broken away or shown in section for clarity;

FIG. 2 is an enlarged, isometric view taken from a position generally to the right of FIG. 1, with parts thereof broken away, or shown in section for clarity;

FIG. 3 is a top plan view of the apparatus shown in FIG. 1, with parts thereof broken away or shown in section for clarity;

DETAILED DESCRIPTION OF THE DRAWINGS

Figure 4:
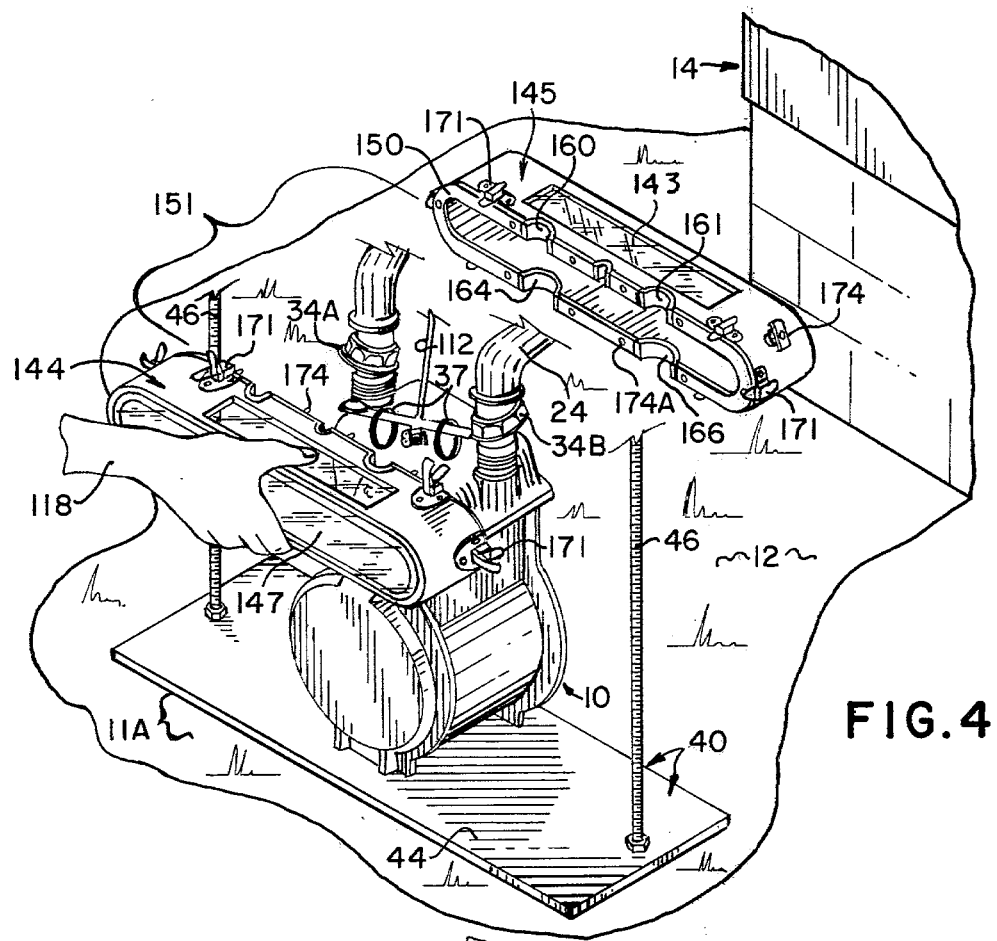
FIG. 4 is an isometric, pictorial view illustrating a preferred embodiment of the present invention in which the enclosure means comprises a two-piece expansible member adapted to be coupled to the meter loop, the view illustrating preferred component relationships generally as they appear during immediately prior to meter removal or immediately after meter replacement.

With reference now to the appended drawings, reference numeral 10 is generally employed to indicate a meter to be exchanged from an adjacent meter loop 11. Meter 10 is of conventional construction and is suspended from the meter loop 11 a predetermined distance 11A above ground 12 adjacent a building or other structure 14 of the gas consumer. The meter loop includes a pair of conventional spaced apart, vertical input and output pipes 16A, 16B respectively which are coupled via elbows 17 to horizontal, forwardly projecting portions 20, 21.

Gas is transmitted from an adjacent, burried gas line through stanchion 16A for delivery to the customers application via meter 10 and return pipe 16B. The structure to be described in more detail hereinafter provides a temporary bypass through this meter loop circuit to prevent gas interruption as meters are removed or changed.

Meter loop portions 20, 21 terminate at a spaced-apart distance in terminal elbows 24, from which threadably secured, downwardly-projecting flanged terminal ends 26 extend. As seen most clearly in FIG. 6, the terminal ends 26 terminate in typical coupling flanges 28 adapted to be flangably coupled to the threaded input and output pipes 31, 32 respectively on the meter 10 via a pair of conventional swivel mounting nuts 34. Conventional washers 37 provide a seal when the meter is coupled to the meter loop.

It will thus be recognized that the meter loop 11 previously described is of conventional construction, and is adapted to receive a variety of gas meters simply by proper manipulation of swivel nuts 34. However, it should be appreciated that the concept of the present invention is adapted for use with gas meters mounted on meter loops of different and varying dimensions or types. Swivel nut loosening will thus facilitate removal of the meter 10 from the meter loop 11. As mentioned earlier, if a meter is removed in this fashion, without the equipment to be later described herein, gas service to customer structure 14 will be interrupted.

To prevent the meter from inadvertently dropping once the swivel nuts are loosened, and to later aid in attaching the replacement meter, a securing means generally identified by a reference numeral 40 is preferably employed. The securing means 40 preferably comprises an upper, horizontally oriented plane 42 which is adapted to be positioned generally across the meter loop portions 20, 21 being thereby supported by the meter loop 11. Plane 42 may preferably be comprised of a generally rectangular, metallic structure formed of aluminum or the like. A lower, cooperating horizontal plate 44 is spaced-apart from and coupled to upper plate 42 via a pair of elongated, threaded vertical support members 46, 47. Supports 46, 47 are through a pair of orifices, and wing nuts (or other adjusting devices) 48 may be twisted to draw support shelf 44 toward top 42. Hence, once the support structure 40 is suitably coupled to the meter loop 11, the meter 10 may be biased in place relative to meter loop terminals 26, to permit removal of swivel nuts 34 without interruption of service. In a preferred form the support bracket 40 includes a pair of generally C-shaped clamps 50, 52 (FIGS. 2–3) which are adapted to be secured to plate 42 with conventional bolts 54 which penetrate plate 42 and which are secured thereto by nuts 56. It will be apparent from FIG. 2 that channel clamps 50, 52 are adapted to be secured in substantially surrounding relation to the horizontal pipe members 20, 21 respectively of the meter loop 11. In operation it is recommended that nuts 56 be firmly tightened to facilitate firm coupling of the supporting frame 40 to the meter loop 11.

Figure 7:
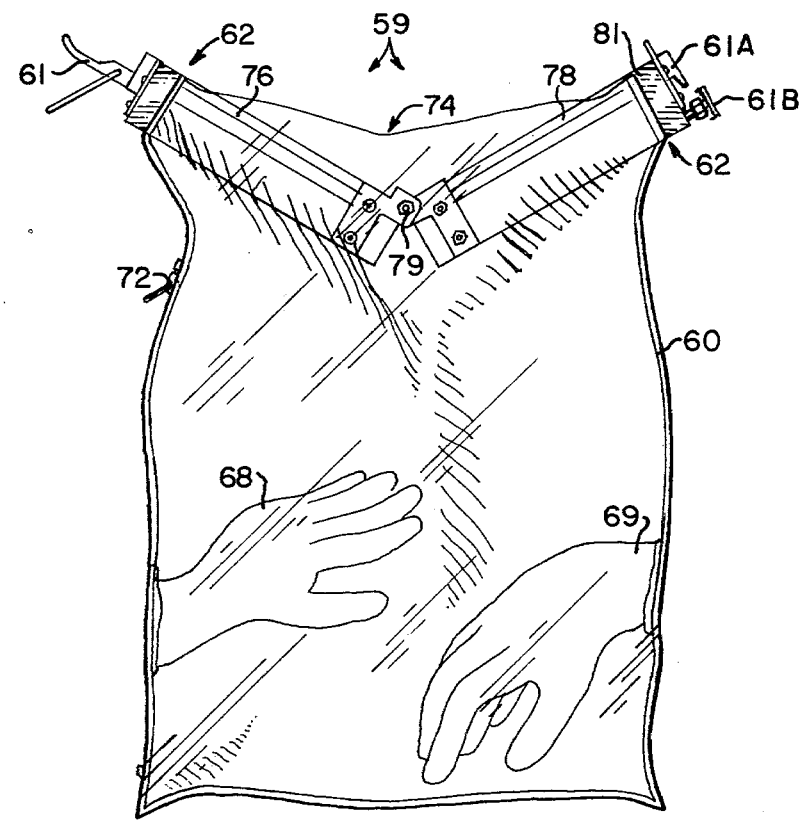
FIG. 7 is a side view of the alternative bag enclosure means, with parts thereof broken away or shown in section for clarity or omitted for brevity.
Figure 9:
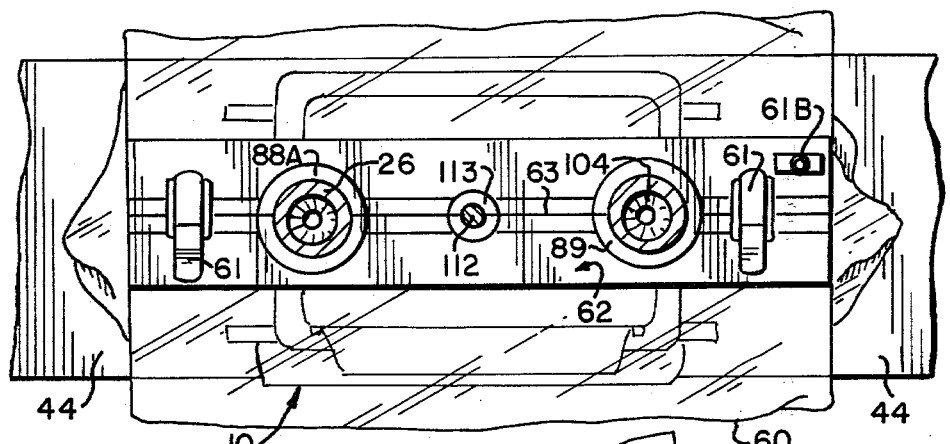
Figure 8:
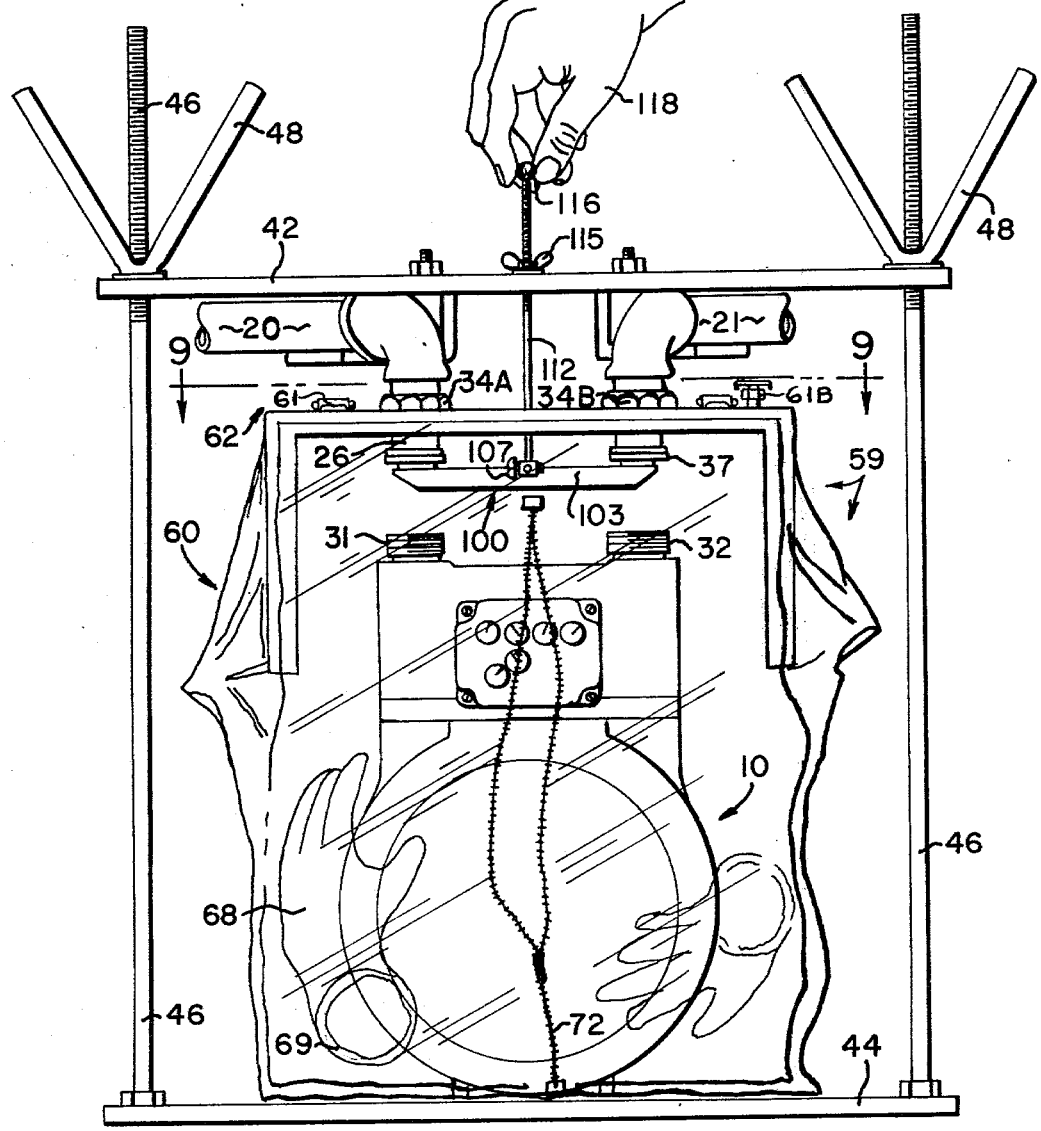
FIG. 8 is an enlarged view of a meter and meter loop illustrating proper placement of the alternative bag form of the isolating enclosure means used to provide a fluid flow bypass when the meter is disconnected, with parts thereof broken away or shown in section for clarity; and, FIG. 9 is a plan view taken generally along line 9—9 of FIG. 8 in the direction of the arrows illustrating the attachment of the back top to the meter swivel loop structure, with parts thereof broken away or shown in section for clarity.

With reference now to FIGS. 7-9, one form of an isolation bypass enclosure system is illustrated. This isolating, enclosing system 59 is adapted to substantially surround the meter 10 to be exchanged and to abut the meter loop system whereby to provide a seal. System 59 totally encloses the meter and provides a fluid flow bypass between conduits 20, 21 whereby to avoid interruption of service. To this effect, it is contemplated that isolating enclosure bag 60 may be placed about the meter 10 prior to tightening of support board 44. As viewed in FIG. 9 the top 62 of the bag 60 is adapted to conform to the spaced apart meter loop terminals 26. Hence, after the bag is closed the mutually abutting preferably, rubber edges 63 thereof will sealably abut the meter loop pipes and provide a fluid flow bypass volume about the meter loop area. When filled with gas, the bag will provide a meter bypass effect. In operation the bag will first be tightly clamped in position with conventional clamps 61, best illustrated in FIG. 9, prior to tightening of wing nuts 48 (which secure the meter against the meter loop). After the bag has appropriately been installed, sealed glove means 68 formed in the side of the bag may be employed by the workman to advance his hands interiorly of the bag to unfasten the previously loosened swivel nuts 34A, 34B. Prior to completely removing swivel nuts 34A, 34B (which have previously been loosened by wrench exteriorly of the bag) it is advisable to loosen nut 34A until bag 60 fills suitably with gas whereby to accomplish a purging effect. To purge air from bag 60, a bag purge valve 61B may be opened, and subsequent "tilting" of the meter (after removal of swivel nut 34A) will fill the bag with gas. As the bag later fills with gas a fluid flow path will be completed whereby subsequent complete removal of the meter 10 from the meter loop will not interrupt the gas flow path between meter loop terminals 26.

As seen in FIG. 8, the bag 60 may be provided with a zipper access 72 which may alternatively be slightly opened to facilitate purging. Complete zipper opening will aid the workman in reaching into the bag interior, in cooperation with glove means 68. The bag sides are preferably transparent.

As will be appreciated from FIGS. 7-9, bag 60 is of sufficient dimensions to entirely surround the meter 10. The upper mouth 74 of the bag is formed between a pair of preferably rubber sides 76, 78 which are preferably coupled together by pin 79 and adapted to be pivotally secured in abutting relation to close the bag. The leading edge portions 80, 81 of the mouth structure are properly contoured by notches 88, 89 whereby to sealably surround the periphery of meter loop terminals 26 once the bag 60 is appropriately installed (prior to tightening of the wing nuts 48). Upper flange coupling members 90, 91 may be secured together by a pair of elongated coupling bolts 94, which may be manually threadably tightened by rotation of handle 95, driving shaft 94 into threadable engagement with coupling nut 97. In this manner the bag may be appropriately closed to generate the seal required for the prevention of gas service interruption.

Figure 6:
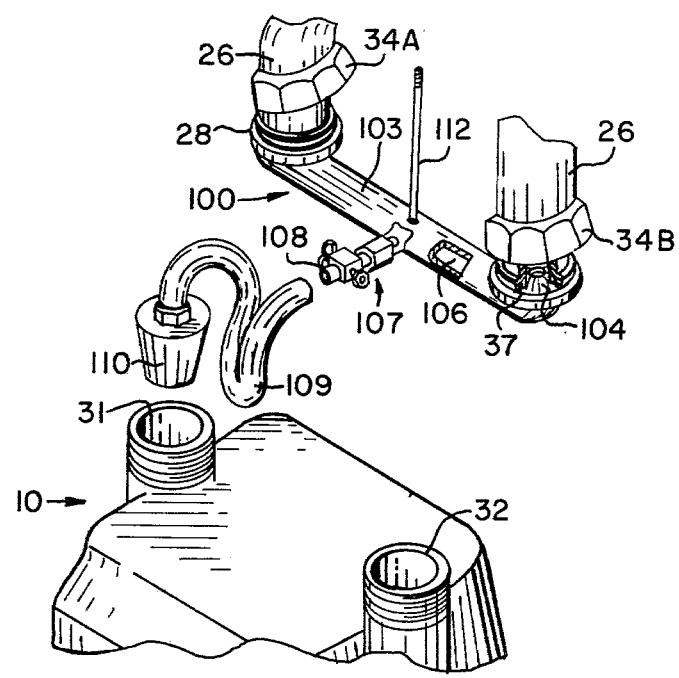
FIG. 6 is an isometric view illustrating the bypass conduit purging system and the purging plug preferably employed to remove air from a meter to be exchanged and from the interior of the isolating enclosure, with parts thereof broken away or shown in section for clarity.

It is necessary to maintain a fluid flow bypass across the meter 10 removed from service. As best illustrated in FIG. 6 an elongated, preferably rigid bypass conduit 100 having a major portion 103 terminating in upwardly-turned, tapered plug portions 104, which are adapted to be inserted in meter loop terminal ends 26. It will be appreciated that the bypass conduit means 100 is of tubular construction, permitting free passage of gas between terminals 26. Intermediately along the length of body 103 a purge valve petcock structure 107 is provided, for introducing gas into the surrounding enclosure. As best viewed in FIG. 6, it will be appreciated that the valve structure 107 includes a projection 108 adapted to be coupled to a purge plug hose 109 which terminates in a purge plug 110. Purging plug 110 is adapted to be inserted into the input pipe 31 of a replacement meter 10 being exchanged to fill the meter with gas thereby purging it of air. The bypass conduit 100 includes a vertically upwardly extending threaded portion 112 thereof which is adapted to extend vertically upwardly through bag top 62 (sealably passing through contours 113) and upper frame support plate 42, being secured thereto by a wing nut 115. Portion 112 terminates in an end piece 116 may be manually grasped by the hand 118 of the workman whereby to properly mount the conduit 100 after the bag is fastened. Thus, while the fluid flow integrity of the meter loop has been maintained by passage of gas through the volume of the bag itself. The meter loop conduit 100 may be thus stuck between the pipes 26 to provide an alternate meter bypass route. It should be appreciated that during operation the conduit 100 will previously have been inserted within the bag to be accessible interiorly thereof. Once the conduit 100 is inserted in place in such a manner that it is firmly attached to the underside of terminals 26, it may be secured in place by improper operative position by correctly tightening nut 115. At this point it should be appreciated that by simply unzipping or removing the bag 60, the now disconnected meter 10 may be removed, and a replacement meter may be reinserted. It should be appreciated that for the purposes of this discussion the reference numeral 10 is used to indicate both replacement and replaced meters. Thus FIG. 8 also illustrates component orientation prior to final attachment of a replacement meter.

After insertion of the replacement meter, and subsequent closing of bag 60, purging of air within the bag is required. To this effect it has been found desirable to interconnect purge plug 110 (which also was inserted interiorly of the bag 60) between meter coupling 31 and petcock 107. In this fashion gas will be transmitted from conduit structure 100 into the meter 110, displacing a volume of air from pipe 32. As gas later emerges from pipe 32, the interior or the bag will be filled, air being displaced through vent valve 61B. Proper bag purging will be reached when the workman subsequently observes slight expansion of the bag walls in response to gas pressure.

Bag 60 preferably includes a transparent portion 61 formed on the side thereof which permit easy visual inspection of the interior of the bag and, in particular, the meter dial index 9. As will be readily appreciated, the transparent area 61 permits or facilitates proper placement of the bypass conduit 100. Moreover, after the purge plug 110 is properly inserted within meter orifice 31, observation of the index 9 will indicate proper gas flow in the purging operation. Glove means 68 preferably comprise elongated, stretchy glove portions which permit sealed insertion of the hands of the operator into the bag interior. The lower arm portion 69 of the glove means 68 are sealably connected about the periphery of the bag to prevent leakage of fluid between the bag interior and exterior.

At this point it is then desirable to remove conduit 100 simply by releasing or loosening wing nut 115 and pushing down on the apparatus until conduit 100 is disconnected from meter loop terminals 26, at which point the conduit will drop to the bottom of the bag. Subsequent tightening of wing nuts 48 associated with the frame support system 40 will move the replacement meter 10 upwardly into engagement with the meter loop terminals 26. Prior to this point, it is desirable to have inserted new washers for sealing the swivel nuts. Simply by hand tightening the swivel nut 34A, 34B against threaded terminals 31, 32 the meter 10 will be subsequently maintained relative to the meter loop to maintain gas service. Afterwards, the bag structure 60 may be completely removed by removing and loosening frame support structure 40 and hence opening the bag top 62 whereby to expose mouth 74 to remove the bag completely. At this point it is contemplated that a wrench or other proper hand tool may be suitably employed to properly permanently secure the swivel nuts.

Figure 5:
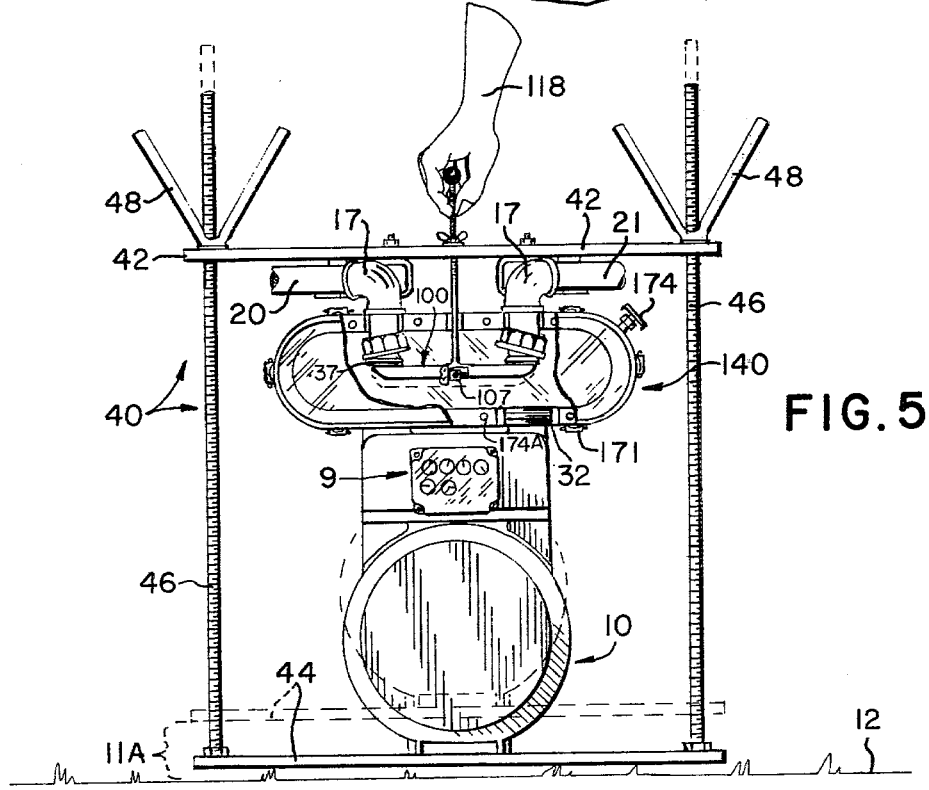
FIG. 5 is a front plan view of the embodiment shown in FIG. 4, with parts thereof broken away or shown in section for clarity, illustrating component relationships generally as they would appear after removal of a meter to be replaced, (or immediately prior to installation of a replacement meter) with parts thereof broken away or shown in section for clarity, and with the meter attachment position illustrated generally by dashed lines.

Turning now to FIGS. 4 and 5, a preferred embodiment of the present invention is shown. In particular, with the system depicted in FIGS. 4 and 5 the previously discussed bag 60 has been omitted in favor of a more rigid, segmented enclosure means 151. Enclosure means 151 performs essentially the same function as bag 60 already discussed, in that it initially provides an alternative gas flow path between meter loop conduits 20, 21 to prevent the interruption of gas service. However, the gas system is constructed differently, and need not be large enough to entirely surround the meter. System 151 can not be used, however, where the meter 10 to be replaced or exchanged is extremely close to the ground 12, since lowering of the frame support system 40 to the extreme position illustrated in FIG. 5 would not be possible. Thus if distance 11A (FIG. 5) is extremely small, the previously discussed bag enclosure bypass system 59 should be employed.

System 151 comprises a pair of flexible, expansible volumes 144, 145 of generally cubicle dimensions. Portions 144, 145 are virtual mere images of each other, and are adapted to be sealably coupled about the meter loop terminals.

Portions 144, 145 include flexible rubber sides 147 of generally rectangular shape, which seal loop body portion 149. Body 149 transparent and sides 147 are formed of resilient, flexible material such as rubber or the like. Each portion 144, 145 includes a reinforced edge portion 150 formed of resilient rubber, and it will be appreciated that said ends are adapted to abut each other when coupled appropriately as will later be described in detail. A pair of spaced-apart contours 160, 161 are provided at the top of each member 144, 145 to conformingly seal around the meter loop terminals 26, which they surround once the apparatus 140 is installed. Corresponding lower indentations 164, 166 are provided in the sealing periphery 150 to similarly conformingly seal meter conduits 31, 32, which they surround in operation.

In operation the frame assembly 40 may be first positioned as previously described. Afterwards, both swivel nuts 34A, 34B may be suitably loosened as with a wrench or the like. Afterwards, enclosure segments 144, 145 are coupled together about the gas conduits or fitting previously described. As in the previous case, the rigid metallic gas bypass means 100 may be position such that its horizontal main body portion 103 will extend substantially between conduits 26. Afterwards members 144, 145 will be coupled together by conventional clamping assemblies 171. Mutual alignment of the two sections 144, 145 is facilitated by alignment pins 174 (member 144) adapted to be secured within corresponding holes 174A (member 145). When conventional members 171 are fastened together, the interior of the structure will be isolated from the outside. At this time it is desirable to purge the interior of the volume 140. By slightly loosening swivel nut 34A gas will be admitted, driving out unwanted air through vent valve 174. Transparent panels 143, 147 and observation.

Afterwards, frame support wing nuts 48 may be loosened to drop the meter 10 to the lower position illustrated in FIG. 5. It will be apparent that as the meter drops, structure 151 will be flexible enough to expand, whereby to permit sufficient clearance to be developed between meter fittings 31, 32 and the terminal ends 126 of the meter loop 11. Subsequently, conduit bypass structure 100 is inserted to bypass the enclosure section 140 to prevent interruption of service, and it may be manipulated and fastened in place in the manner previously discussed conduit 100 is inserted, clamps 171 may be appropriately opened to open enclosure 140 whereby to release meter 10 and accept the replacement meter. However, prior to re-securing couplings 171 whereby to seal the replacement meter, the purging plug 110 previously described in conjunction with FIG. 6 may be inserted into fitting 31 of the meter to purge the meter of air by introducing gas therein. Once the enclosure 140 is tightened appropriately gases exiting meter coupling 32 will be vented through valve 174. After this purge step is completed, it will be apparent that rigid bypass coupling 100 may be removed from the meter loop, being conveniently dropped into the interior enclosure. At this time, of course, gas flow continuity will be maintained through the enclosure until the replacement meter is mated and secured to the meter loop. To draw the replacement meter into operative position wing nuts 48 may simply be tightened. When the replacement is tightly in place, structure 140 may be removed to permit subsequent tightening of swivel nuts 34A, 34B. In this manner a new meter will be installed without interrupting any gas service.

From the foregoing, it will be seen that this invention is one well adapted to obtain all the ends and objects herein set forth, together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. Apparatus for removing and replacing a gas meter without interrupting customer gas service, the meter coupled to meter loop terminals by a pair of swivel nuts, the apparatus comprising:
   means for temporarily securing said meter relative to said meter loop independently of said swivel nuts;
   isolative enclosure means adapted to be removably, sealably coupled about said meter loop terminals in fluid flow relation therewith whereby to bypass said meter;
   bypass conduit means adapted to be first stored within said enclosure means for temporarily bypassing said meter after said meter and enclosure are removed, thereby maintaining gas service in the absence of an installed gas meter; and,
   purge means for purging air both from a replacement meter to be subsequently installed and the interior of said isolative enclosure without interrupting gas service said purge means comprising valve means coupled to said bypass conduit means and purge plug means in fluid flow communication with said purge valve means adapted to be coupled to a replacement meter whereby to purge said replacement meter and said isolative enclosure means of air.

2. The combination as defined in claim 1 wherein said enclosure means comprises a bag means adapted to be selectively sealably coupled about said meter loop terminals in surrounding relation with respect to a gas meter being exchanged, said bag means including a foldably closable upper mouth adapted to be sealably coupled about said meter loop terminals, said bag means further including internal access means permitting a user to reach inside said bag means without introducing air into the bag means, the access means comprising glove means interiorly associated with said bag means in fluid seal integrity therewith.

3. The combination as defined in claim 1 wherein said enclosure means comprises a flexible, expansible volume comprising at least two portions adapted to be selectively sealably coupled together about said meter loop without enclosing the meter to be exchanged for maintaining fluid flow integrity through said meter loop independently of said meter, said enclosure volume including transparent inspection plate means for permitting visual observation of its interior and means permitting at least a portion of said bypass conduit means to be manually manipulated exteriorly of said enclosure.

4. The combination as defined in claim 3 wherein said enclosure volume includes transparent inspection plate means for permitting visual observation of its interior.

5. The combination as defined in claim 3 wherein said enclosure volume includes means permitting at least a portion of said bypass conduit means to be manualy manipulated exteriorly of said enclosure.

6. A method of removing and replacing a gas meter coupled to a meter loop terminals with conventional coupling means without interrupting customer service, said method comprising the steps of:

temporarily securing the meter to be removed relative to the meter loop to which the meter has already been connected independently of said coupling means;

providing a fluid pathway for bypassing said meter by sealably enclosing a volume about said meter loop terminals in fluid flow communication therewith;

purging air from said fluid bypass pathway volume prior to disconnecting said meter whereby to fill said volume with gas;

disconnecting said meter to be replaced from said meter loop terminals;

bridging said meter loop terminals with a bypass conduit to permit removal of said enclosing volume and said meter to be replaced without interrupting gas flow through said meter loop;

removing said fluid pathway bypass volume;

removing said meter to be replaced and substituting a replacement meter;

reestablishing a fluid flow pathway for bypassing said replacement meter by reenclosing a volume about said meter loop terminals;

purging air from the reestablished fluid flow pathway volume and from said replacement meter; said purging step including the steps of venting said bypass conduit to introduce gas into said reestablished volume and inserting a purge plug connected in fluid flow communication with said bypass conduit into a meter outlet to purge same;

removing said bypass conduit from said meter loop terminals;

attaching said replacement meter to said meter loop terminals; and, removing said reestablished fluid flow pathway volume.

7. The method as defined in claim 6 wherein said steps of providing and reestablishing a fluid flow bypass volume each include the step of entirely surrounding either the meter to be removed or the replacement meter with a bag having a mouth adapted to be releasably sealably coupled to said meter loop terminals, including the step of manually reaching interiorly of said bag with glove means sealably coupled to the bag for permitting interior access while maintaining seal integrity.

8. The method as defined in claim 6 wherein said steps of providing and reestablishing a fluid flow bypass volume each include the step of releasably sealably intercoupling at least two flexible expansible members together in encircling relation with respect to said meter loop terminals in sealed mechanical contact with at least a portion of meter to be exchanged, and including the step of manipulating said bypass conduit from a position exteriorly of said volume via a portion of said bypass conduit accessible exteriorly of said expansible members.

* * * * *